(12) United States Patent
Yonai

(10) Patent No.: US 11,005,778 B1
(45) Date of Patent: May 11, 2021

(54) PRIORITY FLOW CONTROL IN A DISTRIBUTED NETWORK SWITCH ARCHITECTURE

(71) Applicant: Marvell Israel (M.I.S.L) Ltd., Yokne'am (IL)

(72) Inventor: Yakov Yonai, Tel Aviv (IL)

(73) Assignee: Marvell Israel (M.I.S.L) Ltd., Yokne'am (IL)

(*) Notice: Subject to any disclaimer, the term of this patent is extended or adjusted under 35 U.S.C. 154(b) by 0 days.

(21) Appl. No.: 16/550,095

(22) Filed: Aug. 23, 2019

Related U.S. Application Data

(60) Provisional application No. 62/722,088, filed on Aug. 23, 2018.

(51) Int. Cl.
*H04L 12/927* (2013.01)
*H04L 12/835* (2013.01)
*H04L 12/801* (2013.01)
*H04L 12/841* (2013.01)

(52) U.S. Cl.
CPC .......... *H04L 47/805* (2013.01); *H04L 47/283* (2013.01); *H04L 47/29* (2013.01); *H04L 47/30* (2013.01)

(58) Field of Classification Search
CPC ..... H04L 47/805; H04L 47/283; H04L 47/29; H04L 47/30
See application file for complete search history.

(56) References Cited

U.S. PATENT DOCUMENTS

| 10,708,189 | B1* | 7/2020 | Agrawal | H04L 47/29 |
|---|---|---|---|---|
| 2004/0004961 | A1* | 1/2004 | Lakshmanamurthy | H04L 47/30 370/364 |
| 2005/0094643 | A1* | 5/2005 | Wang | H04L 47/525 370/395.4 |
| 2012/0287787 | A1* | 11/2012 | Kamble | H04L 49/201 370/235 |
| 2019/0334837 | A1* | 10/2019 | Fairhurst | H04L 47/2433 |

* cited by examiner

*Primary Examiner* — Harry H Kim

(57) ABSTRACT

This disclosure describes systems and methods for priority flow control in a network switching device having two or more egress queue managers for managing egress queues of ports of the network switching device. A first egress queue manager determines respective fill levels of packet data that is buffered in egress queues. The first egress queue manager generates a data structure that relates a port of the egress queue manager at which selected packets are ingressed and a port or an egress queue of the egress queue manager from which the selected packets are to be egressed. The first egress queue manager signals to one or more other egress managers the respective fill levels of egress queues along with other information to enable at least one of the other egress queue managers to make a priority flow control decision for one of the ports managed by the other egress queue manager.

20 Claims, 4 Drawing Sheets

PRIORITY FLOW CONTROL IN A DISTRIBUTED NETWORK SWITCH ARCHITECTURE

CROSS-REFERENCE TO RELATED APPLICATION

This disclosure claims the benefit under 35 U.S.C. § 119(e) of commonly-assigned U.S. Provisional Patent Application No. 62/722,088, filed on Aug. 23, 2018, which is hereby incorporated by reference herein in its entirety.

FIELD OF USE

This disclosure relates to network switches and, more particularly, to systems and methods for priority flow control in a distributed network switch architecture.

BACKGROUND OF THE DISCLOSURE

The background description provided herein is for the purpose of generally presenting the context of the disclosure. Work of the inventors hereof, to the extent that the work is described in this background section, as well as aspects of the description that do not otherwise qualify as prior art at the time of filing, are neither expressly nor impliedly admitted to be prior art against the present disclosure.

The volume of traffic that is electronically communicated across the Internet and other packet switching communication networks is enormous and continues to grow rapidly due to mounting demand. Increased capacity and throughput necessitates an ability to handle increasingly large numbers of traffic flows, which necessitates the ability to concurrently manage queue buffers for storing concurrent traffic flows. There are limits, however, to the sizes of integrated circuitry that are commercially available to implement such network switching devices.

One approach to increasing the throughput of a network switching device is to implement the device in a distributed architecture, such as an upscaled modular architecture that includes multiple instances of interconnected network switching circuitry, for instance, utilizing parallel processing cores, parallel queue managers, and the like, that serve a large number of network ports. This approach, however, gives rise to technical challenges.

A conventional network switching device (e.g., a single-chip device, single-processing-core device, or any other type of device having a centralized or non-distributed architecture), for instance, typically implements a priority flow control procedure to pause or resume the incoming data flow at its ingress port based on whether that ingress port is causing congestion in the network switching device. The network switching device typically determines whether to pause or resume the traffic for a particular ingress port based on an amount of data from an ingress port the device has buffered. For example, if the device has received more than a threshold amount of data from a particular ingress port, indicated for example by a fill level of a device buffer, the device pauses the incoming data for that ingress port until the buffered data can be transmitted from the device via one or more egress ports. In a distributing network switching architecture, challenges arise in implementing priority flow control since egress queue managers may need to implement priority flow control procedures based in part on ingress data from ingress ports to which they are not directly coupled.

SUMMARY

Embodiments described herein provide a method for priority flow control in a network switching device having two or more egress queue managers for managing egress queues of ports of the network switching device. In one aspect, the method comprises determining, at a first egress queue manager, respective fill levels of packet data that is buffered in egress queues managed by the egress queue manager, the egress queues corresponding to a subset of ports that is less than all of the ports of the network switching device. The first egress queue manager generates a data structure that indicates a relationship between a port of the egress queue manager at which selected packets are ingressed to the network switching device and a port or an egress queue of the egress queue manager from which the selected packets are to be egressed from the network switching device. The first egress queue manager signals to one or more other egress managers, the one or more other egress queue managers managing different ports than the first egress queue manager, the respective fill levels of egress queues managed by the first queue manager along with indications of the relationship between the port at which selected packets are ingressed to the network switching device and the port or egress queue from which the selected packets are to be egressed from the network switching device, to enable at least one of the other egress queue managers to make a priority flow control decision for one of the ports managed by the other egress queue manager.

In another aspect, the determining the respective fill levels of packet data is performed by packet counters that correspond to the egress queues, respectively, and are configured to count their respective fill levels of packet data for their respective egress queues.

In a further aspect, the network switching device comprises a plurality of serial chains of the counters, the serial chains being coupled to one another in parallel.

In yet another aspect, the respective fill levels of egress queues are signaled to the one or more other egress managers at least partially in a parallel manner.

In one aspect, the respective fill levels of egress queues are signaled repeatedly, each time the respective fill levels of egress queues are determined at the first egress queue manager.

In another aspect, the data structure indicates that at least some packets are ingressed to the network switching device via a first port having a first one of the egress queues and are egressed from the network switching device from a second port having a second one of the egress queues, the first and second ones of the egress queues being managed by different egress queue managers.

In a further aspect, the method further comprises comparing the respective fill levels of egress queues to a threshold; and in response to determining that the respective fill levels of egress queues exceeds the threshold, transmitting, from at least one of the egress queue managers to a media access control (MAC), a message causing a data flow at one or more ports of the network switching device to be paused.

In yet another aspect, the method further comprises comparing the respective fill levels of egress queues to a threshold and in response to determining that the respective fill levels of egress queues are less than the threshold, transmitting, from one of the egress queue managers to a media access control, a message causing a data flow at one or more ports of the network switching device to resume.

In one aspect, each egress queue buffers a plurality of packets, and each packet includes an identifier of a port at which the packet ingressed to the network switching device to enable aggregation of fill levels for all packets that ingressed at the port and are buffered in the multiple egress queues of the network switching device.

In another aspect, the determining the respective fill levels of packet data is performed by packet counters that correspond to the egress queues, respectively, and are configured to maintain running counts of their respective fill levels of packet data for their respective egress queues.

Embodiments described herein also provide a network switching device with priority flow control. In one aspect, the network switching device comprises ports, egress queues of the ports, and two or more egress queue managers for managing egress queues of the ports of the network switching device. A first of the egress queue managers is configured to determine respective fill levels of packet data that is buffered in the egress queues managed by the egress queue manager, the egress queues corresponding to a subset of ports that is less than all of the ports of the network switching device. The first egress queue manager generates a data structure that indicates a relationship between a port of the egress queue manager at which selected packets are ingressed to the network switching device and a port or an egress queue of the egress queue manager from which the selected packets are to be egressed from the network switching device. The first egress queue manager signals to one or more other egress managers, the one or more other egress queue managers managing different ports than the first egress queue manager, the respective fill levels of egress queues managed by the first queue manager along with indications of the relationship between the port at which selected packets are ingressed to the network switching device and the port or egress queue from which the selected packets are to be egressed from the network switching device, to enable at least one of the other egress queue managers to make a priority flow control decision for one of the ports managed by the other egress queue manager.

In yet another aspect, the network switching device further comprises packet counters that correspond to the egress queues, respectively, wherein the determining the respective fill levels of packet data is performed by the packet counters, which are configured to count their respective fill levels of packet data for their respective egress queues.

In one aspect, the network switching device further comprises a plurality of serial chains of the counters, the serial chains being coupled to one another in parallel.

In another aspect, the first egress queue manager is configured to signal the respective fill levels of egress queues at least partially in a parallel manner.

In a further aspect, the first egress queue manager is configured to signal the respective fill levels of egress queues repeatedly, each time the respective fill levels of egress queues are determined at the first egress queue manager.

In yet another aspect, the data structure indicates that at least some packets are ingressed to the network switching device via a first port having a first one of the egress queues and are egressed from the network switching device from a second port having a second one of the egress queues, the first and second ones of the egress queues being managed by different egress queue managers.

In one aspect, the first egress queue manager is further configured to compare the respective fill levels of egress queues to a threshold and in response to determining that the respective fill levels of egress queues exceeds the threshold, transmit, to a media access control (MAC), a message causing a data flow at one or more ports of the network switching device to be paused.

In another aspect, the first egress queue manager is further configured to compare the respective fill levels of egress queues to a threshold and in response to determining that the respective fill levels of egress queues are less than the threshold, transmit, to a media access control, a message causing a data flow at one or more ports of the network switching device to resume.

In a further aspect, each egress queue buffers a plurality of packets, and each packet includes an identifier of a port at which the packet ingressed to the network switching device to enable aggregation of fill levels for all packets that ingressed at the port and are buffered in the multiple egress queues of the network switching device.

In yet another aspect, the first egress queue manager is configured to determine the respective fill levels of packet data by utilizing packet counters that correspond to the egress queues, respectively, and are configured to maintain running counts of their respective fill levels of packet data for their respective egress queues.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

In view of the need for network switching devices that have increased throughput and that are able to implement priority flow control, in accordance with implementations described herein systems and methods for priority flow control in a network switching device with a distributed architecture are provided. In particular, embodiments described herein provide large-scale network switching circuitry and techniques for efficiently ascertaining accurate buffer fill levels for each of many ingress ports distributed across a set of processing cores, to facilitate appropriate pause and resume commands for each ingress port for proper priority flow control.

Figure 1:
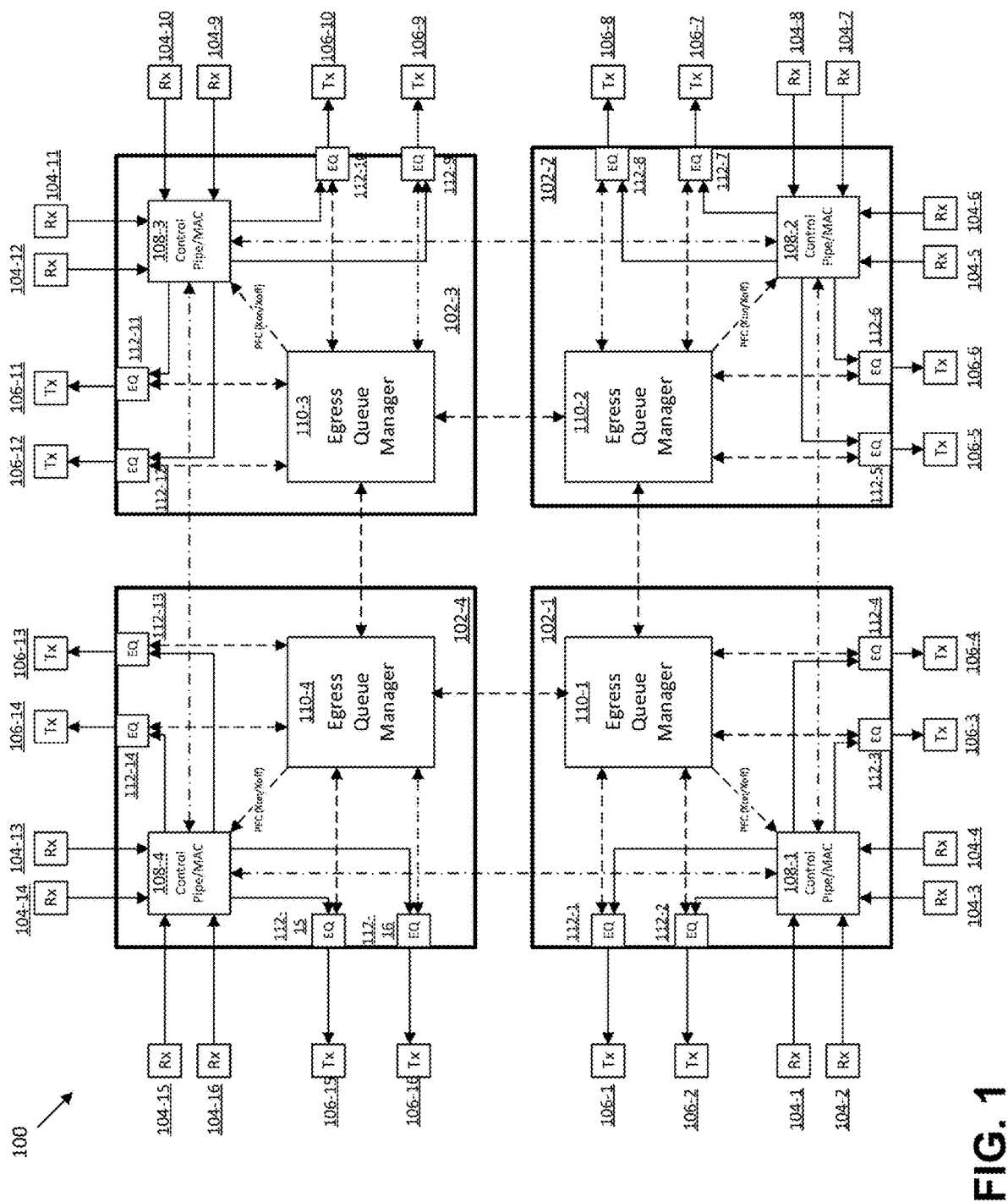
FIG. 1 is a schematic representation of a distributed network switch architecture with priority flow control, in accordance with some embodiments of the subject matter of this disclosure.

FIG. 1 is a schematic representation of a distributed-architecture network switch device 100 with priority flow control, in accordance with some embodiments of the subject matter of this disclosure. Network switch device 100 seen in FIG. 1 includes multiple circuit tiles 102-1, 102-2, 102-3, and 102-4 (collectively, 102) that are communicatively coupled to one another by way of circuit paths. Various ones of the circuit tiles 102 are also communicatively coupled to various ones of ingress ports 104-1 through 104-16 (collectively, 104) and egress ports 106-1 through 106-16 (collectively, 106). Although the present disclosure describes network switching device 100 as having multiple tiles, this is provided as merely one example type of distributed architecture. Other types of distributed architectures are also contemplated within the scope of this disclosure. For instance, in some distributed architectures, multiple egress queue managers are provided for a network switching device, even in some cases on a single processing core. Additionally, although FIG. 1 shows ingress ports 104 and egress ports 106, this is for ease of illustration only. In some embodiments, each port of the network switching device 100 is bidirectional, including at least one ingress port and at least one egress port. When ingress ports 104 and/or egress ports 106 are described herein, it is noted that reference is being made to an ingress port or an egress port that is part of a bidirectional ingress/egress port.

Circuit tiles 102 also include respective ones of control pipes and MACs 108-1 through 108-4 (collectively, 108), egress queue managers 110-1 through 110-4 (collectively, 110), and egress queues 112-1 through 112-16 (collectively, 112). During operation, data packets arrive at one or another of the ingress ports 104 are processed (both for ingress and egress purposes) at the control pipe 108 on the same circuit tile 102 as the respective ingress ports 104, and control pipe 108 routes the packet to one or another of the egress ports 106 for egress. In some distributed architectures, data arriving at any ingress port 104 can be routed to any egress port 106, even if the ingress port 104 and egress port 106 are located on different circuit tiles 102 and/or they are coupled to different control pipe/MAC units and/or they their respective egress queues are managed by different egress queue managers 110. The present disclosure provides components and techniques to keep track of buffer fill levels for ingress ports 104 in such a distributed architecture.

In particular, as described in further detail below, the egress queue managers 110 handle aspects of egress processing including scheduling, shaping, and priority flow control for packets after determination of a port to which a packet is to be forwarded and egressed from the network device. The egress queue managers 110 are coupled to one another and configured to work together to (1) determine a total aggregated amount of data and/or packets from particular ingress ports 104 that is buffered in the various distributed egress port queues 112 and circuit tiles 102 and (2) publish the total amount of data among the egress queue managers 110 to enable the egress queue managers 110 to make priority flow control decisions for ingress ports 104 based on complete and accurate buffer fill level data. To that end, each egress queue manager 110 provides a priority flow control message (such as an on/off message) to a respective MAC 108 on the same circuit tile 102 to enable the MAC 108 to pause or resume incoming traffic flow at the various ingress ports 104 for priority flow control.

Figure 2:
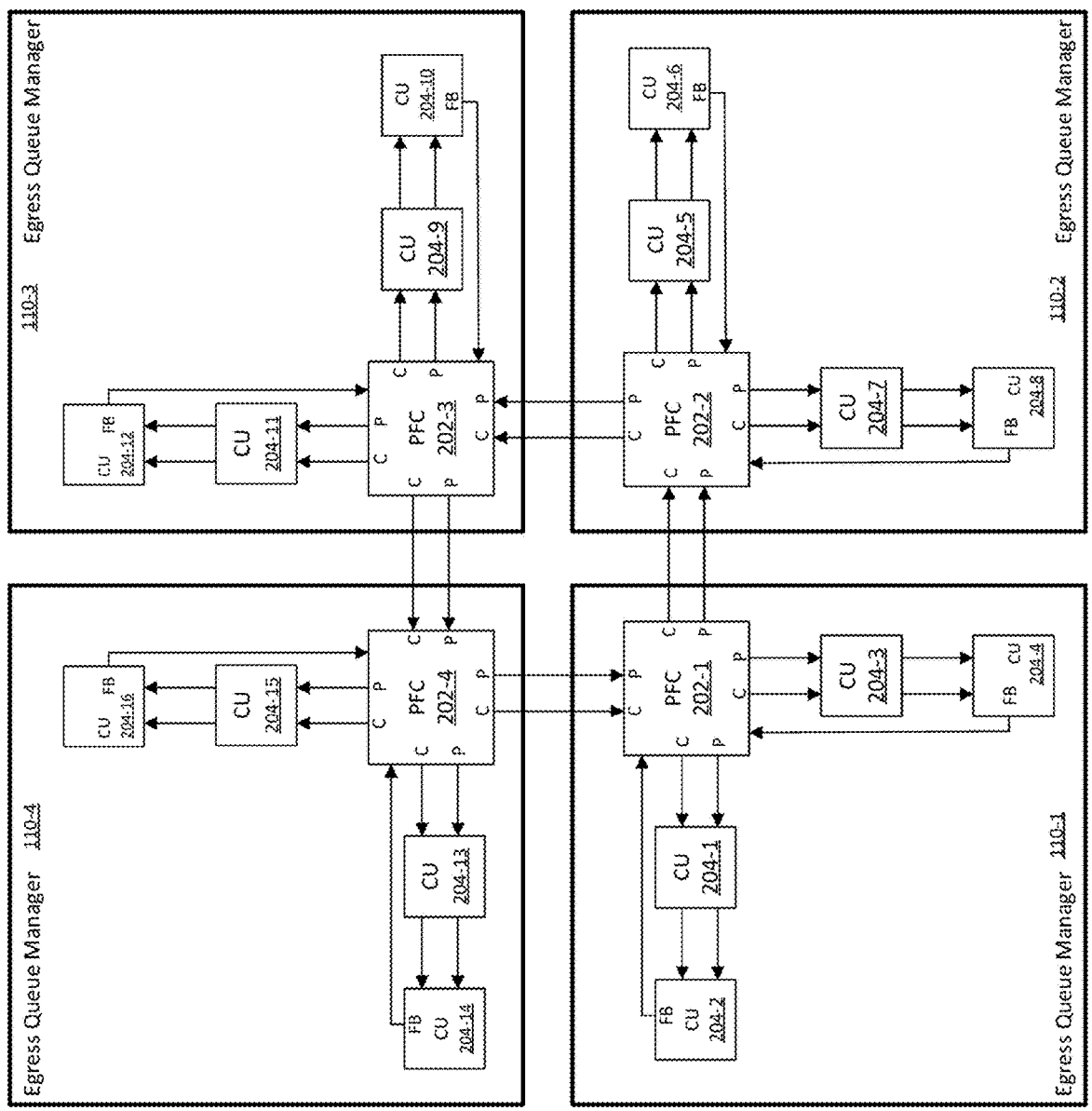
FIG. 2 is a block diagram showing additional details of the network switch architecture of FIG. 1, in accordance with embodiments of the subject matter of this disclosure.

FIG. 2 is a block diagram showing additional details of the distributed architecture network switching device of FIG. 1, in accordance with embodiments of the subject matter of this disclosure. In the embodiment depicted in FIG. 2, the egress queue managers 110 include respective ones of priority flow controllers 202-1 through 202-4 (collectively, 202) and counting units 204-1 through 204-16 (collectively, 204). The priority flow controllers 202 determine when to pause or resume traffic flow from ingress ports 104, and the counting units 204 count or otherwise determine buffer fill levels for traffic from ingress ports 104. Each priority flow controller 202 is communicatively coupled to certain serial chains of the counting units 204 by way of various paths including a command port (C) and a publishing port (P). Commands (e.g., commands to count buffer fill levels for certain ingress ports) are provided to the counting units 204 via the command ports. Total buffer fill level counts for ingress ports are published to the counting units 204 via the publishing ports. The counting unit 204 located at the end of each serial chain of counting units 204 furthest from the priority flow controller 202 is coupled to the priority flow controller 202 by way of a feedback port (FB) by which the counting unit 204 provides a subtotal of an amount of data that originated from particular ingress port(s) 104 and is buffered in egress queues (not shown in FIG. 2) in that serial chain. The architecture by which a certain number of counting units 204 are serially coupled to one another, and by which another number of such serial chains of counting units 204 are coupled to a priority flow controller 202, may be tailored to suit a particular application, for instance based on a tradeoff between processing speed, circuit complexity, and/or circuit real estate utilization. For instance, while parallel counters may be faster from a processing perspective, they also may require more circuit real estate. And while serially coupled counters may be slower from a processing perspective, they may be simpler to implement and require less circuit real estate. The priority flow controllers 202 are communicatively coupled to one another in a serial loop as well, to enable aggregation of subtotals to yield total amounts of data that originated from a particular ingress port 104 and is buffered across all circuit tiles 102, for use in priority flow control.

Figure 4:
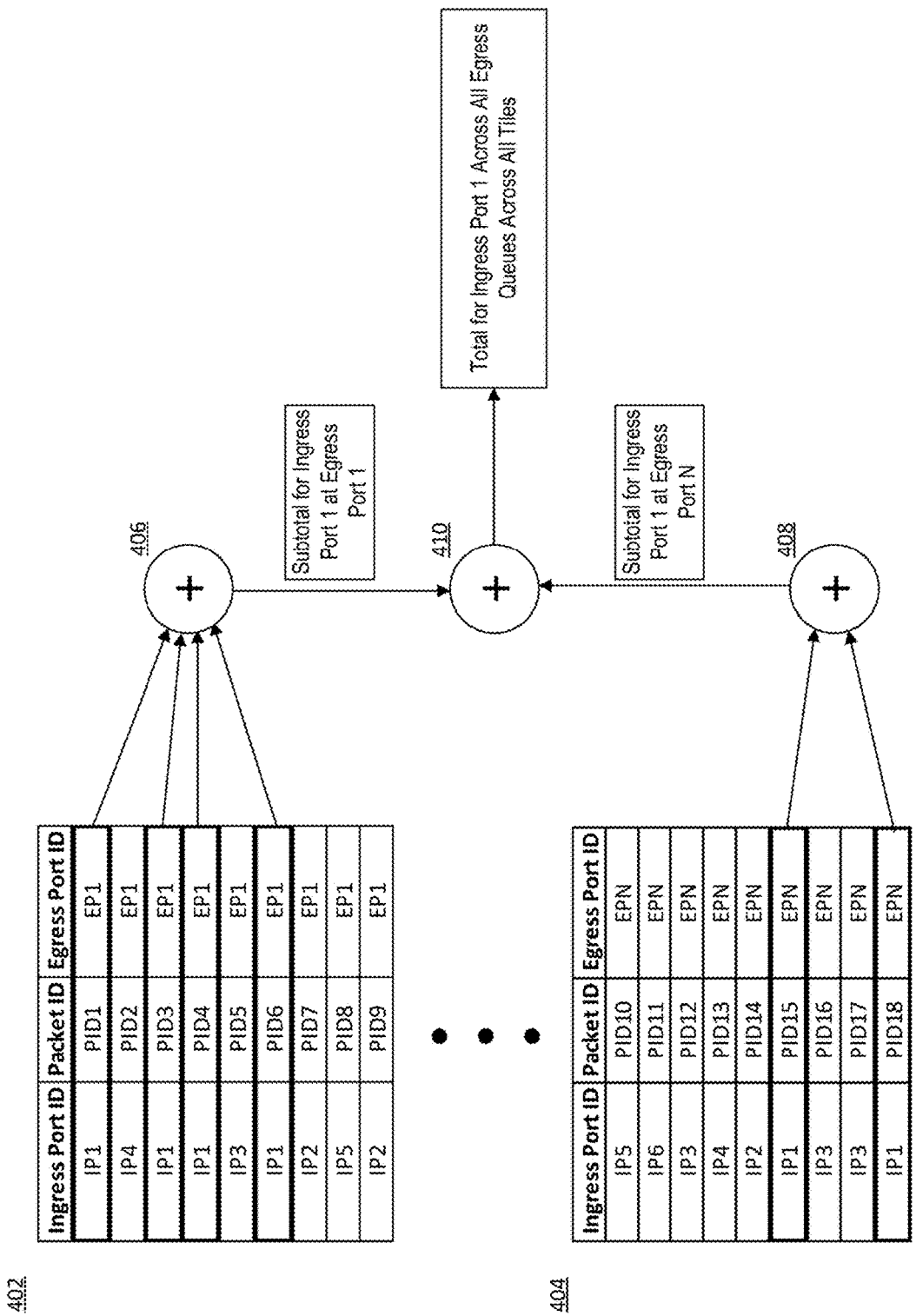
FIG. 4 is a diagram showing the aggregation of ingress port buffer size across a distributed network architecture, in accordance with embodiments of the subject matter of this disclosure.

Each counting unit 204 is generally associated with a corresponding one of egress ports 106 and a corresponding one of the egress queues 112, and is configured to count, in response to an ingress port-specific counting command triggered by a priority flow controller 202, the fill levels (e.g., number of packets) stored at the egress queue 112 for that egress port 106, along with other types of information, such as identifiers of the ingress port from which each buffered packet originated, a traffic class or flow of the packets, and/or the like (see, e.g., FIG. 4). Although in FIG. 2 a single CU 204 is depicted for a respective egress port, it is noted that in some implementations there may be more than one CU 20 for a particular port, or respective CUs 20 may be configured to count fill level data for two or more buffers that are associated with a given egress port (for instance, when two or more different packet flows are egressed through a particular egress port). Since the system 100 includes multiple distributed egress queue managers 110 that manage non-overlapping sets of egress queues 112, the counting units 204 are configured to count or otherwise determine the buffer fill levels for their respective egress queues 112, and feed them back to a decision making entity, such as one or more of the priority flow controllers 202, to enable those priority flow controllers 202 to make informed decisions about whether to pause or resume a traffic flow at a particular ingress port 104.

Figure 3:
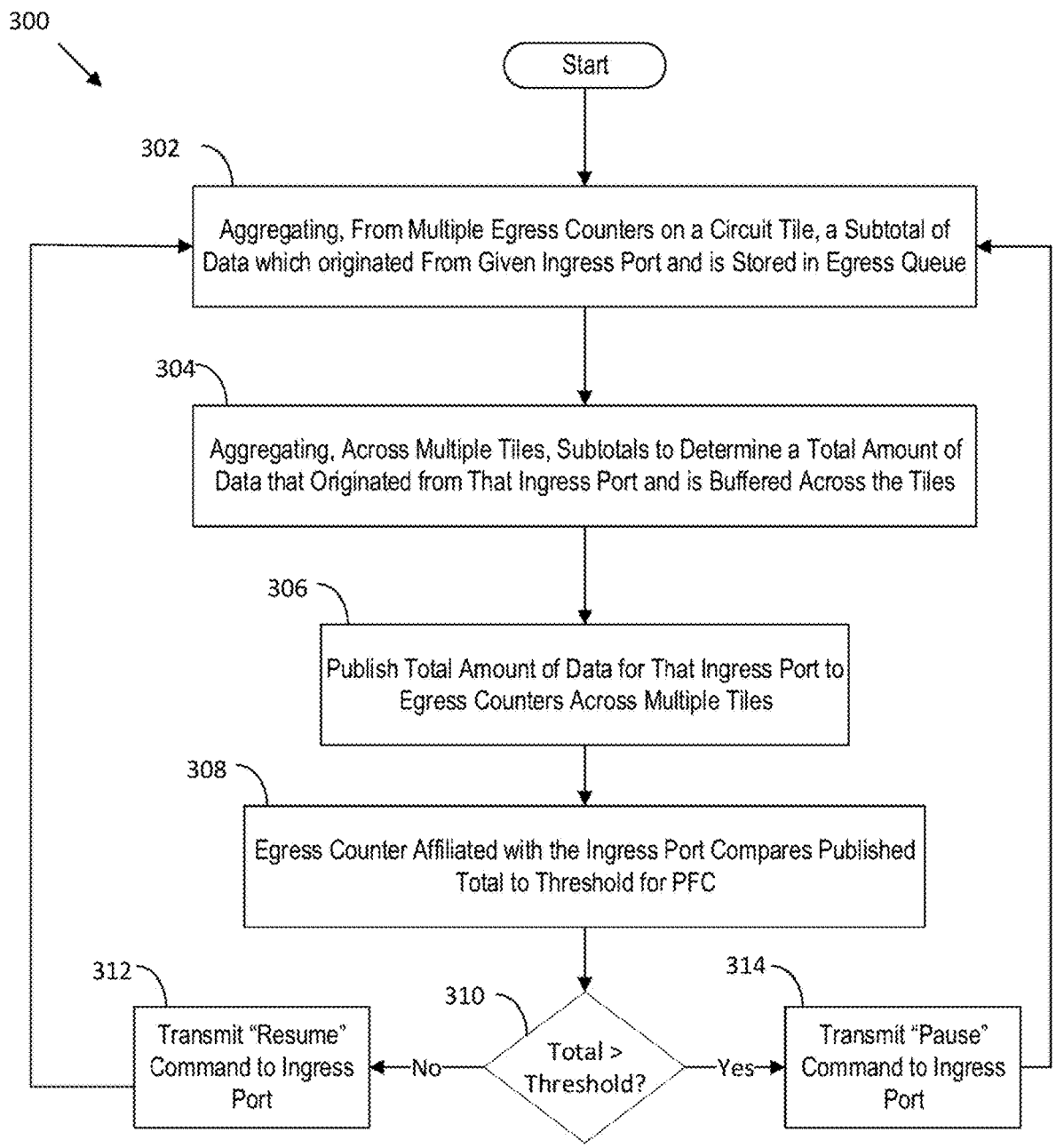
FIG. 3 is a flow diagram of a method for priority flow control in a distributed network switch architecture, in accordance with embodiments of the subject matter of this disclosure.

FIG. 3 is a flow diagram of a method 300 for priority flow control in distributed-architecture network switching device 100, in accordance with embodiments of the subject matter of this disclosure. Although the method 300 is provided in the context of a single ingress port 104, the method 300 may be implemented in parallel for multiple ingress ports 104. At 302, a master priority flow controller, for example, priority flow controller 202-1, sends a command to counting unit 204-1 to cause counting unit 1 to count from its affiliated egress queue (for example, egress queue 112-1 as seen in FIG. 1) an amount of data buffered in that egress queue 112-1 that originated from a particular ingress port, say ingress port 104-1). In response, counting unit 204-1 uses an ingress port identifier (see, e.g., FIG. 4) to identify and count packets of data stored for ingress port 104-1. Counting unit 204-1 then forwards that count and the command to the next counting unit 204-2 in the chain to cause that counting unit 204-2 to count its egress queue for data packets buffered from the ingress port 104-1. Counting unit 204-2 then returns a subtotal amount of data that originated from ingress port 104-1 and is buffered in that serial chain of counting units 204-1 and 204-2. Priority flow controller 202-1 then forwards that subtotal together with the command to counting unit 204-3 to repeat the counting process described above.

After receiving the updated subtotal from counting unit 202-4, at 304, priority flow controller 202-1 forwards the updated subtotal together with the command to priority flow controller 202-2 to cause priority flow controller 202-2 to repeat that process. Priority flow controllers 202-3 and 202-4 repeat the process in turn until finally a total amount of data that originated from ingress port 104-1 and is buffered in one or another of egress queues 112 is returned to the master priority flow controller 202-1. At 306, the master priority flow controller 202-1 publishes the total amount of data using the publish data path to each of the counting units 204, in some cases at least partially in parallel (e.g., publishing to priority flow controller 202-2, and to counting unit 204-1, and to counting unit 204-3 in parallel).

An egress queue manager determines fill levels only for the egress buffers of ports which it manages (i.e., to which it is coupled), and then signals the determined fill level results to the other distributed egress queue managers on the device. As a result, each egress queue manager is equipped to maintain egress fill level data for all of the egress queues, including egress queues of ports which it manages, as well as egress queues of ports that are managed by another egress queue manager. Because fill level data determined at each egress queue manager is signaled to all of the egress queue managers on the device, each egress queue manager has egress buffer fill levels for every port on the device, including both those that it manages as well those that are managed by other egress queue managers. Accordingly, because a packet ingressing via a port coupled to an egress queue manager can be forwarded to any other port on the device, and because the egress queue manager QM has egress buffer fill level information for every port on the device, the egress queue manager is able to selectively control a port that it manages (i.e., to which it is coupled), to send flow control messages based on egress fill levels associated with any port, including those ports which it does not manage.

At 308, the counting unit 204-1 compares using compare circuitry (not shown in the figures) the total amount of data buffered in device 100 for ingress port 104-1, as published at 306, to a threshold. If the total amount of data published at 306 does not exceed the threshold ("No" at 310), then at 312, counting unit 204-1 causes its priority flow controller 202-1 to send a message to MAC 108-1 to resume incoming data flow at ingress port 104-1. If the total amount of data published at 306 exceeds the threshold ("Yes" at 310), then at 314 counting unit 204-1 causes its priority flow controller 202-1 to send a message to MAC 108-1 to pause incoming data flow at ingress port 104-1 for priority flow control. From 312 or 314, control passes back to 302 to repeat the procedure in the manner described above for continuous priority flow control for the ingress port 104.

FIG. 4 is a diagram showing the aggregation of fill levels for ports managed by different egress queue managers in a network switching device, in accordance with embodiments of the subject matter of this disclosure. An egress queue manager manages a subset of the ports. The ports have egress queues. The egress queue manager determines the fill level for egress queues which manages. Those fill levels are signaled to other egress queue managers using one or more data structures as seen in FIG. 4 (402, 404), which identify a relationship between packets, ingress ports and egress ports. The egress queue manager is configured to aggregate (406, 408, 410) data from the data structure to develop a composite picture of the fill levels for the ports/egress queues throughout the switch. Using aggregated indications of egress port congestion at ports throughout the device, in conjunction with correspondence to the ingress ports, the egress queue manager is configured to selectively send PFC messages from the ports it manages (functioning as ingress ports) to pause the inflow of packets through the ports that it manages.

Various embodiments discussed in conjunction with FIGS. 1-4 are performed by control circuitry or various electronic components of one or more electronic circuits, such as but not limited to an integrated circuit, application-specific integrated circuit (ASIC), Field Programmable Gate Array (FPGA), and/or other like circuitry. In addition, or alternatively, various embodiments and components disclosed herein are configured to be at least partially operated and/or implemented by processor-executable instructions, for example firmware instructions, that are stored on one or more transitory or non-transitory processor-readable media in memory.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein are employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

Other variations are within the scope of the following claims.

What is claimed is:

1. A method for priority flow control in a network switching device having two or more egress queue managers for managing egress queues of ports of the network switching device, the method comprising:
   determining, at a first egress queue manager, respective fill levels of packet data that is buffered in egress queues managed by the first egress queue manager, the egress queues corresponding to a subset of the ports that is less than all of the ports of the network switching device;
   generating, at the first egress queue manager, a data structure that indicates a relationship between
   (i) a port, of the network switching device, at which selected packets are ingressed to the network switching device and
   (ii) a port or an egress queue, of the network switching device, from which the selected packets are to be egressed from the network switching device; and signaling to one or more other egress queue managers, the one or more other egress queue managers managing different ports than the first egress queue manager, the respective fill levels of egress queues managed by the first egress queue manager along with indications of the relationship between the port, of the network switching device, at which selected packets are ingressed to the network switching device and the port or egress queue, of the network switching device, from which the selected packets are to be egressed from the network switching device, to enable at least one of the other egress queue managers to make a priority flow control decision for one of the ports managed by the other egress queue manager.

2. The method of claim 1, wherein the determining the respective fill levels of packet data is performed by packet counters that correspond to the egress queues, respectively, and are configured to count their respective fill levels of packet data for their respective egress queues.

3. The method of claim 2, wherein the network switching device comprises a plurality of serial chains of the counters, the serial chains being coupled to one another in parallel.

4. The method of claim 1, wherein the respective fill levels of egress queues are signaled to the one or more other egress managers at least partially in a parallel manner.

5. The method of claim 1, wherein the respective fill levels of egress queues are signaled repeatedly, each time the respective fill levels of egress queues are determined at the first egress queue manager.

6. The method of claim 1, wherein the data structure indicates that at least some packets are ingressed to the network switching device via a first port having a first one of the egress queues and are egressed from the network switching device from a second port having a second one of the egress queues, the first and second ones of the egress queues being managed by different egress queue managers.

7. The method of claim 1, further comprising:
comparing the respective fill levels of egress queues to a threshold; and
in response to determining that the respective fill levels of egress queues exceeds the threshold, transmitting, from at least one of the egress queue managers to a media access control (MAC), a message causing a data flow at one or more ports of the network switching device to be paused.

8. The method of claim 1, further comprising:
comparing the respective fill levels of egress queues to a threshold; and
in response to determining that the respective fill levels of egress queues are less than the threshold, transmitting, from one of the egress queue managers to a media access control, a message causing a data flow at one or more ports of the network switching device to resume.

9. The method of claim 1, wherein each egress queue buffers a plurality of packets, and each packet includes an identifier of a port at which the packet ingressed to the network switching device to enable aggregation of fill levels for all packets that ingressed at the port and are buffered in the multiple egress queues of the network switching device.

10. The method of claim 1, wherein the determining the respective fill levels of packet data is performed by packet counters that correspond to the egress queues, respectively, and are configured to maintain running counts of their respective fill levels of packet data for their respective egress queues.

11. A network switching device with priority flow control, the network switching device comprising ports;
egress queues of the ports;
two or more egress queue managers to manage egress queues of the ports of the network switching device, the two or more egress queue managers including a first egress queue manager configured to:
determine respective fill levels of packet data that is buffered in the egress queues managed by the first egress queue manager, the egress queues corresponding to a subset of the ports that is less than all of the ports of the network switching device;
generate a data structure that indicates a relationship between
(i) a port, of the network switching device, at which selected packets are ingressed to the network switching device and
(ii) a port or an egress queue, of the network switching device, from which the selected packets are to be egressed from the network switching device; and
signal to one or more other egress queue managers, the one or more other egress queue managers managing different ports than the first egress queue manager, the respective fill levels of egress queues managed by the first queue manager along with indications of the relationship between the port, of the network switching device, at which selected packets are ingressed to the network switching device and the port or egress queue, of the network switching device, from which the selected packets are to be egressed from the network switching device, to enable at least one of the other egress queue managers to make a priority flow control decision for one of the ports managed by the other egress queue manager.

12. The network switching device of claim 11, further comprising packet counters that correspond to the egress queues, respectively, wherein the determining the respective fill levels of packet data is performed by the packet counters, which are configured to count their respective fill levels of packet data for their respective egress queues.

13. The network switching device of claim 12, wherein the network switching device comprises a plurality of serial chains of the counters, the serial chains being coupled to one another in parallel.

14. The network switching device of claim 11, wherein the first egress queue manager is configured to signal the respective fill levels of egress queues at least partially in a parallel manner.

15. The network switching device of claim 11, wherein the first egress queue manager is configured to signal the respective fill levels of egress queues repeatedly, each time the respective fill levels of egress queues are determined at the first egress queue manager.

16. The network switching device of claim 11, wherein the first egress queue manager is configured to signal the respective fill levels of egress queues repeatedly, each time the respective fill levels of egress queues are determined at the first egress queue manager.

17. The network switching device of claim 11, wherein the first egress queue manager is further configured to:
compare the respective fill levels of egress queues to a threshold; and
in response to determining that the respective fill levels of egress queues exceeds the threshold, transmit, to a media access control (MAC), a message causing a data flow at one or more ports of the network switching device to be paused.

18. The network switching device of claim 11, wherein the first egress queue manager is further configured to:
   compare the respective fill levels of egress queues to a threshold; and
   in response to determining that the respective fill levels of egress queues are less than the threshold, transmit, to a media access control, a message causing a data flow at one or more ports of the network switching device to resume.

19. The network switching device of claim 11, wherein each egress queue buffers a plurality of packets, and each packet includes an identifier of a port at which the packet ingressed to the network switching device to enable aggregation of fill levels for all packets that ingressed at the port and are buffered in the multiple egress queues of the network switching device.

20. The network switching device of claim 11, wherein the first egress queue manager is configured to determine the respective fill levels of packet data by utilizing packet counters that correspond to the egress queues, respectively, and are configured to maintain running counts of their respective fill levels of packet data for their respective egress queues.

\* \* \* \* \*